United States Patent
Hernández Schafhauser

(10) Patent No.: US 12,474,383 B2
(45) Date of Patent: Nov. 18, 2025

(54) DETERMINING POWER CONSUMPTION BY TELEVISION

(71) Applicant: GOOGLE LLC, Mountain View, CA (US)

(72) Inventor: Andrés Hernández Schafhauser, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 18/471,572

(22) Filed: Sep. 21, 2023

(65) Prior Publication Data

US 2025/0102548 A1    Mar. 27, 2025

(51) Int. Cl.
| | | |
|---|---|---|
| *G01R 21/06* | (2006.01) | |
| *G01J 1/42* | (2006.01) | |
| *H04N 17/00* | (2006.01) | |
| *H04N 21/442* | (2011.01) | |

(52) U.S. Cl.
CPC ............ *G01R 21/06* (2013.01); *G01J 1/4204* (2013.01); *H04N 17/004* (2013.01); *H04N 21/4424* (2013.01)

(58) Field of Classification Search
CPC ..... G01R 21/06; G01J 1/4204; H04N 17/004; H04N 21/4424
See application file for complete search history.

(56) References Cited

U.S. PATENT DOCUMENTS

| | | |
|---|---|---|
| 2009/0287433 A1 | 11/2009 | Houston et al. |
| 2010/0082499 A1 | 4/2010 | Luff |
| 2016/0070632 A1 | 3/2016 | Kim et al. |
| 2018/0068637 A1 | 3/2018 | Ninan et al. |
| 2021/0397476 A1* | 12/2021 | Liu ..................... G06F 11/3495 |

OTHER PUBLICATIONS

Amirtharaj, "Energy Measurement and Profiling of Internet of Things Devices", Santa Clara University, Scholoar Commons; Computer Engineering Master's Theses, Jun. 27, 2018, 125 pages.

* cited by examiner

*Primary Examiner* — Minh Q Phan
(74) *Attorney, Agent, or Firm* — Brake Hughes Bellermann LLP

(57) ABSTRACT

A non-transitory computer-readable storage medium comprises instructions stored thereon. When executed by at least one processor, the instructions are configured to cause a computing system to vary at least one light source in a room, the room including the at least one light source and a television; monitor power consumption by the television while varying the at least one light source; and determine an average power consumption by the television during a time period when the power consumption was monitored.

16 Claims, 4 Drawing Sheets

DETERMINING POWER CONSUMPTION BY TELEVISION

TECHNICAL FIELD

This description relates to monitoring power consumption by a television.

BACKGROUND

Televisions rely on power in the form of electricity. Estimates of power consumption by televisions can be based on incorrect assumptions.

SUMMARY

A system can control the conditions under which a television operates, such as the ambient lighting. While controlling the conditions, the system can monitor the power consumption by the television. The system can determine an average power consumption based on the monitoring of the power consumption.

According to an example, a non-transitory computer-readable storage medium comprises instructions stored thereon. When executed by at least one processor, the instructions are configured to cause a computing system to vary at least one light source in a room, the room including the at least one light source and a television; monitor power consumption by the television while varying the at least one light source; and determine an average power consumption by the television during a time period when the power consumption was monitored.

According to an example, a method comprises varying at least one light source in a room, the room including the at least one light source and a television; monitoring power consumption by the television while varying the at least one light source; and determining an average power consumption by the television during a time period when the power consumption was monitored.

According to an example, a non-transitory computer-readable storage medium comprising instructions stored thereon. When executed by at least one processor, the instructions are configured to cause a computing system to vary at least one light source in a room, the room including the at least one light source and a television; instruct the television to open and close multiple applications; monitor power consumption by the television while varying the at least one light source and instructing the television to open and close multiple applications; monitor an intensity of ambient light in the room; and send, to a server, data indicating the power consumption, data indicating opening and closing of the multiple applications, and data indicating the intensity of ambient light in the room.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

Monitoring power consumption by a television while the television is executing a single application and presenting content in a room with a static level of ambient light does not reflect actual conditions in which televisions consume power. A technical problem with monitoring power consumption by a television under these static conditions is that the determination of power consumption based on these conditions does not reflect power consumption by the television under actual use of the television. A technical solution to this technical problem is to vary the conditions under which the television consumes power, such as by changing the ambient lighting around the television. A technical benefit of this technical solution is the determination of a power consumption profile that reflects actual conditions under which the television consumes power.

Figure 1:
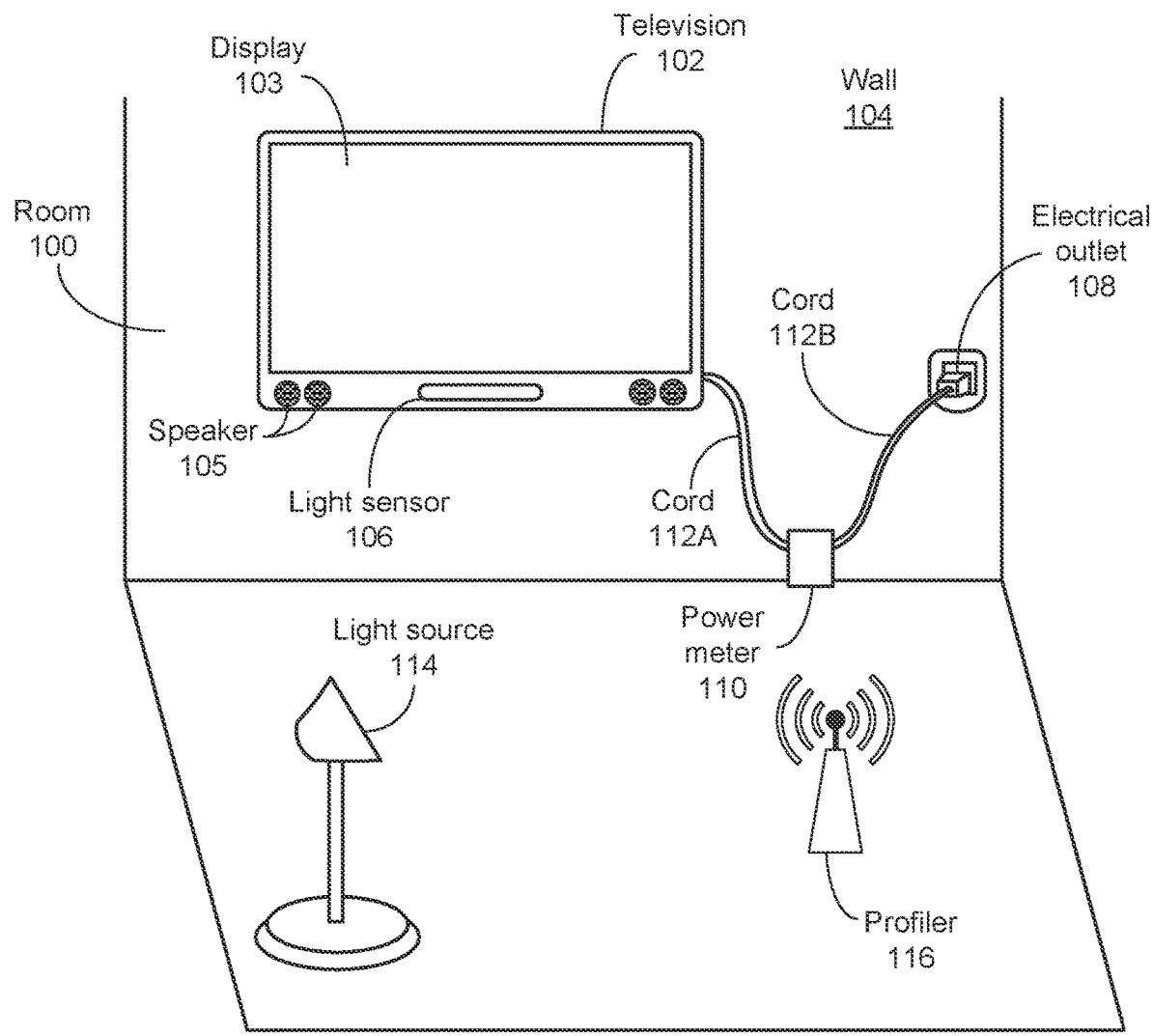
FIG. 1 shows a room with a television for which power consumption is being monitored and conditions are being controlled.

FIG. 1 shows a room 100 with a television 102 for which power consumption is being monitored and conditions are being controlled. The television 102 can be mounted on a wall 104 of the room 100 or supported by a platform that rests on a floor of the room 100. The television 102 can present graphical output and/or images via a display 103. The television 102 can present audio output via one or more speakers 105. While features are described herein as being applied to and/or performed by a television, then can also be applied to and/or performed by a streaming device that communicates with other computing devices via wireless communication protocols and controls output of a television to which the streaming device is coupled, and/or to a set top box or cable box or television decoder that receives a source signal and decodes the source signal into content that will be displayed and/or output by a television.

The room 100 can include an electrical outlet 108. The electrical outlet 108 can be disposed on the same wall 104 on which the television 102 is mounted, or any location within the room 100. The television 102 can draw and/or consume power from the electrical outlet 108.

In some examples, the television 102 can be electrically coupled to the electrical outlet 108 via a power meter 110. The television 102 can be electrically coupled to the power meter 110 via a first electrical cord 112A. The power meter 110 can be coupled to the electrical outlet 108 via a second electrical cord 112B.

The power meter 110 can monitor power consumption of the television 102. The power meter 110 can monitor power consumption of the television 102 by, for example, measuring current flowing through the power meter 110 and a voltage drop across the power meter 110. In some examples, the power meter 110 is coupled to the television 102 via a Universal Serial Bus (USB) cable and a USB port.

The television 102 can include a light sensor 106. The light sensor 106 can detect and/or measure an ambient light within the room 100. The television 102 can modify a brightness of the display 103 based on the ambient light detected and/or measured by the light sensor 106.

The room 100 can include a light source 114. The light source 114 can output visible light. The light source 114 can vary the amount, intensity, and/or brightness of the outputted light, such as between on (with full brightness) to off (with no light output) and, in the example of a light source 114 with dimmer capabilities, can output light at a level less than full brightness. In some examples, the room 100 can also include one or more windows through which varying levels of sunlight enter the room and shine on the television 102.

The room 100 can include a profiler 116. The profiler 116 can monitor data to generate a profile for the television 102. In some examples, the profiler 116 can be combined with the power meter 110 into a single device. The profiler 116 can automate device profiling tasks, such as by sending instructions to the television 102 and/or light source 114 and receiving data from the television 102 and/or power meter 110 without manual instruction from a user or administrator.

The data received by the profiler 116 can include power consumption monitored by the power meter 110, light generated and/or emitted by the light source 114 and/or detected by the light sensor 106, and/or errors in execution of applications and/or an operating system executing on the television 102. In some examples, the profiler 116 is in communication with the television 102. In some examples, the profiler 116 is in communication with the power meter 110. In some examples, the profiler 116 is in communication with the light source 114. The communication between the profiler 116 and the television 102, power meter 110, and/or light source 114 can be via one or more wired and/or wireless interfaces.

In some examples, the profiler 116 can provide input to, and/or control, the television 102. In some examples, the profiler 116 can provide input to the television 102 in a similar manner to a user providing input to the television 102 via a remote control. The input provided to the television 102 by the profiler 116 can include, for example, turning or powering the television 102 on and off, changing channels for the television 102 to present, opening and/or closing applications executing on the television 102, and/or changing settings on the television 102 such as brightness, contrast, or sound level. Applications can include gaming applications, educational applications, or applications that present content provided by particular television and/or broadcast networks, as non-limiting examples. The input provided to the television 102 by the profiler 116 can be random and/or pseudorandom and simulate actual use by a human user of the television 102. The input provided to the television 102 by the profiler 116 can be based on monitored patterns of use by human users and/or based on estimates or predictions of use inputted into the profiler 116 by an administrator or the profiler 116. In some examples, the profiler 116 stores a log of the input provided by the profiler 116 to the television 102.

In some examples, the profiler 116 receives performance data from the television 102. In some examples, the profiler 116 receives the performance data from the television 102 in response to submitting a query to the television 102. In some examples, the profiler 116 receives a log of output from the television 102, such as channels shown, applications executed, brightness levels, contrast levels, and/or audible output levels. In some examples, the profiler 116 receives, from the television 102, ambient light measurements performed by the light sensor 106. In some examples, the profiler 116 receives a log of errors from the television 102, such as times and identifiers of applications that encountered errors and/or stopped executing, and/or error identifiers or codes. In some examples, the profiler 116 receives a log of operating system errors from the television 102 including times of the errors and error identifiers or codes.

In some examples, the profiler 116 receives indicators of power consumption from the power meter 110. In some examples, the profiler 116 receives the indicators of power consumption from the power meter 110 in response to submitting a query to the power meter 110. In some examples, the profiler 116 receives multiple measurements of power consumption at frequent intervals shortly after the measurements are performed by the power meter 110. In some examples, the profiler 116 receives one or more logs from the power meter 110, with each log including multiple measurements of power consumption and times or indicators of the measurements.

In some examples, the profiler 116 provides input to the light source 114 to control the brightness and/or intensity of light emitted by the light source 114. In some examples, the profiler 116 controls brightness and/or intensity of light emitted by the light source 114 based on predicted patterns of users controlling the brightness and/or intensity of light emitted by the light source 114. In some examples, the profiler 116 includes a light sensor (such as a luminance meter) for detecting sunlight entering the room 100 and controls the brightness and/or intensity of light emitted by the light source 114 based on the detected intensity of the sunlight. The profiler 116 can, for example, turn the light source 114 off when the intensity of the sunlight is sufficiently high (such as meeting a sunlight threshold), and turn the light source 114 off when the intensity of the sunlight is sufficiently low (such as not meeting the sunlight threshold).

Figure 2:
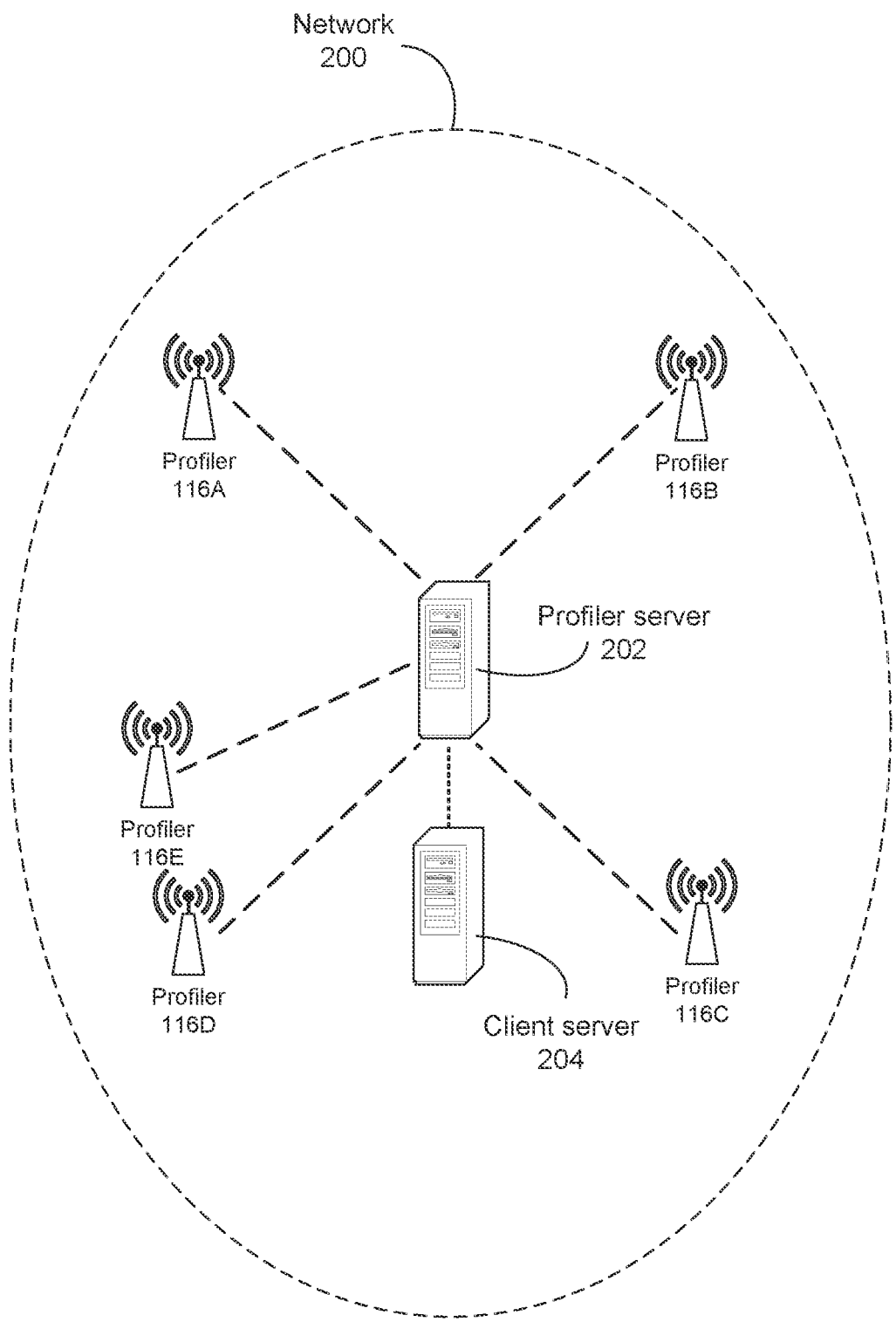
FIG. 2 shows a network that includes a profile server in communication with multiple profilers and a client server.

FIG. 2 shows a network 200 that includes a profile server 202 in communication with multiple profilers 116A, 116B, 116C, 116D, 116E and a client server 204. The network 200 can include a network via which computing systems can communicate, such as a local area network (LAN), wireless local area network (WLAN), or the Internet. The profilers 116A, 116B, 116C, 116D, 116E can have any combination of features and/or functionalities of the profiler 116 described above. The profilers 116A, 116B, 116C, 116D, 116E can each be in communication with a television similar to the television 102, a power meter similar to the power meter 110, and/or a light source similar to the light source 114. While five profilers 116A, 116B, 116C, 116D, 116E are shown in FIG. 2, the profile server 202 can communicate with any number of profilers 116A, 116B, 116C, 116D, 116E.

The profile server 202 can be a server in communication with the profilers 116A, 116B, 116C, 116D, 116E that collects data received and/or generated by the profilers 116A, 116B, 116C, 116D, 116E. The profile server 202 can receive the monitored data and/or measurements from the profilers 116A, 116B, 116C, 116D, 116E. In some examples, the profile server 202 receives the data in real time and generates logs based on the received data. In some examples, the profile server 202 receives logs of data from the profilers 116A, 116B, 116C, 116D, 116E and compiles the logs of data.

The profile server 202 can send the data, which can be compiled as logs of data, to the client server 204. The client server 204 can be a server associated with an entity that has an interest in the television 102 and/or other televisions of same or similar model. The client server 204 can receive the data from the profile server 202 and generate reports based on the data. The reports can include, for example, average power usage, rates of error, and causes and/or events associated with errors. The average power usage and/or average power consumption can be an average power usage and/or average power consumption over a time period during which the power consumption is monitored and/or over a time period during which the power consumption is monitored and the television 102 is in a powered on state.

Figure 3:
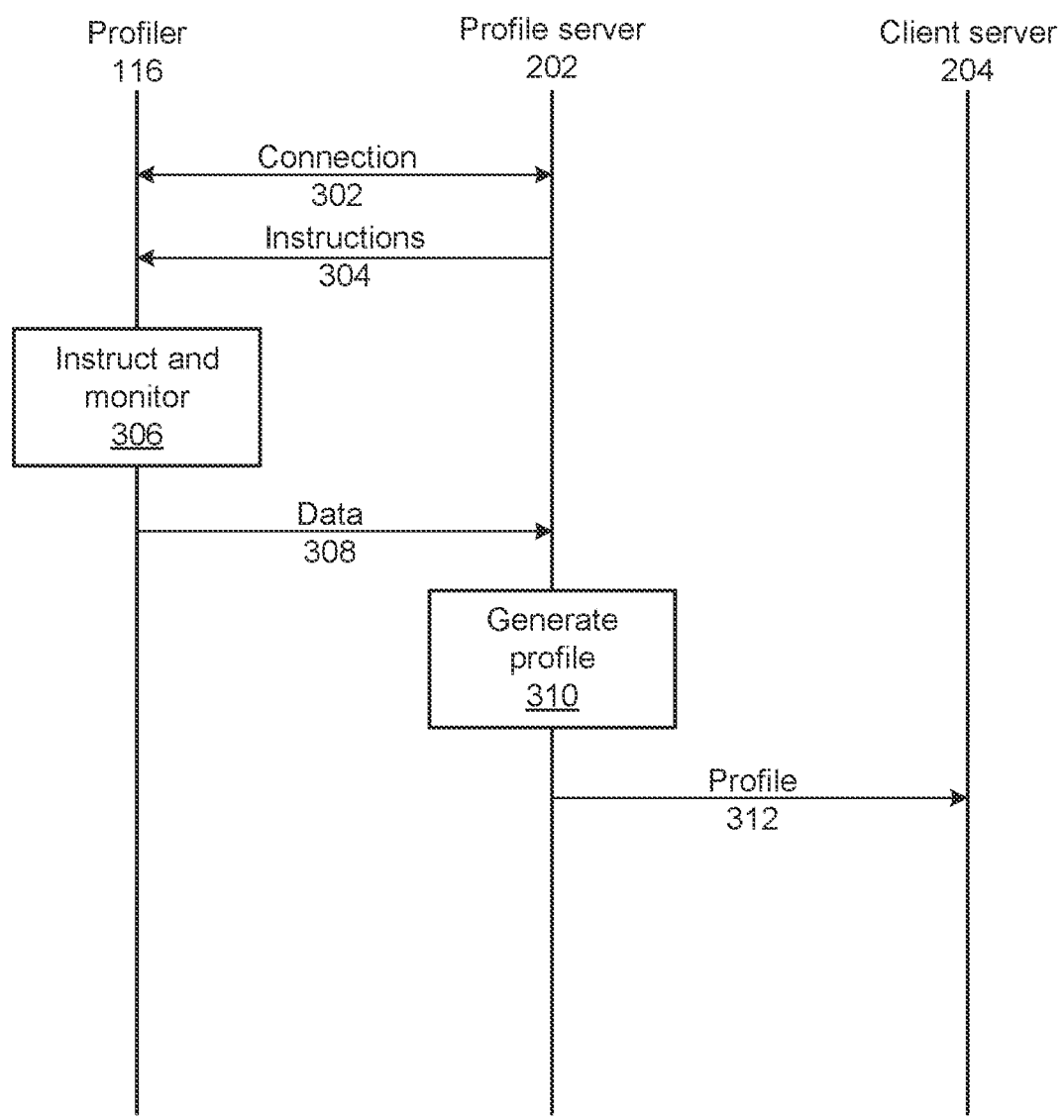
FIG. 3 is a timing diagram showing actions performed by, and communications between, the profile server, a profiler, and the client server.

FIG. 3 is a timing diagram showing actions performed by, and communications between, the profile server 202, a profiler 116, and the client server 204. The profiler 116 can represent any number of profilers (such as the profilers 116A, 116B, 116C, 116D, 116E).

The profile server 202 establishes a connection 302 with the profiler 116. The connection 302 can include a handshake protocol that establishes that the profiler 116 is available to perform monitoring of the television 102 and provide instructions to the television 102 and/or light source 114.

After establishing the connection 302, the profile server 202 can send instructions 304 to the profiler 116. The instructions 304 can include input for the profiler 116 to provide to the television 102 and/or input for the profiler 116 to provide to the light source 114. The instructions and/or input for the profiler 116 to provide to the television 102 and/or light source 114 are described above.

After receiving the instructions 304 from the profile server 202, the profiler 116 can perform instruction and monitoring (306). The instruction and monitoring can include instructions and monitoring as described above with respect to FIG. 1. The instruction and monitoring (306) can include instructing the light source 114 to adjust a brightness of the light source 114. The instruction and monitoring (306) can include varying a power status of the television 102 (such as by instructing the television 102 to power on and off), selecting a channel for presentation, opening and/or closing applications, adjusting the brightness and/or contrast, or adjusting the volume of audio output, as non-limiting examples. The instruction and monitoring (306) can include monitoring the power consumption measured by the power meter 110, monitoring the ambient light, recording and/or monitoring actions performed by the television 102, and/or recording and/or monitoring errors in execution of applications executing on the television 102 and/or the operating system executing on the television 102.

After performing instruction and monitoring (306), the profiler 116 can send data 308 to the profile server 202. The data 308 can include one or more logs of the data monitored by the profiler 116, and/or real-time data for the profile server 202 to compile and/or log.

The profile server 202 can generate a profile (310) based on the data 308. The profile can be a profile of the television 102 that the profiler 116 monitored. The profile can include an average power consumption per minute, per hour, per unit of time while powered on, or per unit of time while the display 103 is presenting graphical output, as non-limiting examples. The profile can include events that are associated with errors in execution of applications and/or errors in execution of the operating system executing on the television 102.

The profile server 202 can send the generated profile 310 to the client server 204. The client server 204 can provide feedback to a user and/or administrator based on the profile. The feedback can include average power consumption and/or events that are associated with errors.

Figure 4:
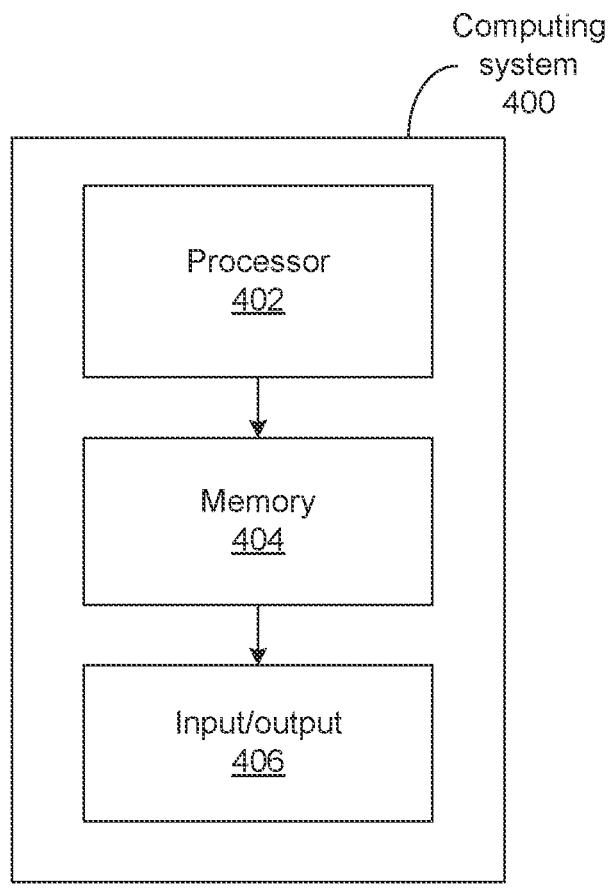
FIG. 4 is a block diagram of a computing system.

FIG. 4 is a block diagram of a computing system 400. The computing system 400 can be an example of any of the profilers 116, 116A, 116B, 116C, 116D, 116E, the profile server 202, and/or the client server 204.

The computing system 400 can include at least one processor 402. The at least one processor 402 can execute instructions, such as instructions stored in at least one memory device 404, to cause the computing system 400 to perform any combination of methods, functions, and/or techniques described herein.

The computing system 400 can include at least one memory device 404. The at least one memory device 404 can include a non-transitory computer-readable storage medium. The at least one memory device 404 can store data and/or instructions thereon that, when executed by at least one processor, such as the processor 402, are configured to cause the computing system 400 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing system 400 can be configured to perform, alone, or in combination with other computing devices, any combination of methods, functions, and/or techniques described herein.

The computing system 400 may include at least one input/output node 406. The at least one input/output node 406 may receive and/or send data, such as from and/or to, the other computing systems (such as the profiler 116, profile server 202, and/or client server 204), and/or may receive input and provide output from and to a user. The input and output functions may be combined into a single node, or may be divided into separate input and output nodes. The input/output node 406 can include, for example, a microphone, a camera, a display, a speaker, a microphone, one or more buttons, and/or one or more wired or wireless interfaces for communicating with other computing devices and/or servers.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computing system to:
    vary an intensity of at least one light source in a room, the room including the at least one light source and a television;
    monitor power consumption by the television while varying the intensity of the at least one light source;
    determine an average power consumption by the television during a time period when the power consumption was monitored; and
    send, to a server, data indicating the average power consumption and the intensity of the at least one light source.

2. The non-transitory computer-readable storage medium of claim 1, wherein the instructions are further configured to cause the computing system vary a power status of the television.

3. The non-transitory computer-readable storage medium of claim 1, wherein the instructions are further configured to cause the computing system to instruct the television to open and close multiple applications.

4. The non-transitory computer-readable storage medium of claim 1, wherein the instructions are further configured to cause the computing system to submit a query to the television.

5. The non-transitory computer-readable storage medium of claim 1, wherein the instructions are further configured to cause the computing system to monitor errors in functioning of the television.

6. The non-transitory computer-readable storage medium of claim 1, wherein the instructions are further configured to cause the computing system to monitor errors in execution of an operating system of the television.

7. The non-transitory computer-readable storage medium of claim 1, wherein the instructions are further configured to cause the computing system to monitor errors in applications executing on the television.

8. The non-transitory computer-readable storage medium of claim 1, wherein the computing system is in the room.

9. A method comprising:
    varying an intensity of at least one light source in a room, the room including the at least one light source and a television;
    monitoring power consumption by the television while varying the at least one light source;
    determining an average power consumption by the television during a time period when the power consumption was monitored; and
    sending, to a server, data indicating the average power consumption and the intensity of the at least one light source.

10. The method of claim 9, further comprising varying a power status of the television.

11. The method of claim 9, further comprising instructing the television to open and close multiple applications.

12. The method of claim 9, further comprising submitting a query to the television.

13. The method of claim 9, further comprising monitoring errors in functioning of the television.

14. The method of claim 9, further comprising monitoring errors in execution of an operating system of the television.

15. The method of claim 9, further comprising monitoring errors in applications executing on the television.

16. A non-transitory computer-readable storage medium comprising instructions stored thereon that, when executed by at least one processor, are configured to cause a computing system to:
    vary at least one light source in a room, the room including the at least one light source and a television;
    instruct the television to open and close multiple applications;
    monitor power consumption by the television while varying the at least one light source and instructing the television to open and close multiple applications;
    monitor an intensity of ambient light in the room; and
    send, to a server, data indicating the power consumption, data indicating opening and closing of the multiple applications, and data indicating the intensity of ambient light in the room.

* * * * *